(12) United States Patent
Hudman

(10) Patent No.: US 9,817,159 B2
(45) Date of Patent: Nov. 14, 2017

(54) STRUCTURED LIGHT PATTERN GENERATION

(71) Applicant: Microsoft Technology Licensing, LLC, Redmond, WA (US)

(72) Inventor: Josh Hudman, Issaquah, WA (US)

( * ) Notice: Subject to any disclaimer, the term of this patent is extended or adjusted under 35 U.S.C. 154(b) by 22 days.

(21) Appl. No.: 14/611,197

(22) Filed: Jan. 31, 2015

(65) Prior Publication Data

US 2016/0223724 A1    Aug. 4, 2016

(51) Int. Cl.
| | |
|---|---|
| G02B 27/48 | (2006.01) |
| G02B 5/02 | (2006.01) |
| G01B 11/25 | (2006.01) |
| G01B 11/14 | (2006.01) |
| G01B 11/22 | (2006.01) |

(52) U.S. Cl.
CPC ............ *G02B 5/0221* (2013.01); *G01B 11/14* (2013.01); *G01B 11/22* (2013.01); *G01B 11/2513* (2013.01); *G02B 5/0263* (2013.01); *G02B 27/48* (2013.01)

(58) Field of Classification Search
CPC ..... G01B 11/14; G01B 11/2513; G01B 11/02; G11B 7/0065; G02B 5/0221; G02B 27/48
See application file for complete search history.

(56) References Cited

U.S. PATENT DOCUMENTS

| | | | |
|---|---|---|---|
| 7,221,356 B2 | 5/2007 | Oliver et al. | |
| 7,593,113 B2 | 9/2009 | Hwang et al. | |
| 7,656,768 B2 * | 2/2010 | Handschy | G02F 1/292 369/103 |
| 8,390,821 B2 | 3/2013 | Shpunt et al. | |
| 2009/0016642 A1 | 1/2009 | Hart | |
| 2011/0158508 A1 | 6/2011 | Shpunt et al. | |
| 2012/0026085 A1 | 2/2012 | McEldowney | |
| 2013/0155195 A1 | 6/2013 | Zalevsky et al. | |
| 2014/0002445 A1 | 1/2014 | Xiong et al. | |

FOREIGN PATENT DOCUMENTS

| | | |
|---|---|---|
| DE | 102013209448 A1 | 11/2014 |
| WO | 2007105205 A2 | 9/2007 |

OTHER PUBLICATIONS

MacCormick, John., "How does the Kinect work?", Published on: Jan. 24, 2013 Available at: http://users.dickinson.edu/~jmac/selected-talks/kinect.pdf.

Zhang, et al., "Real-Time Scalable Depth Sensing With Hybrid Structured Light Illumination", In IEEE Transactions on Image Processing, vol. 23, Issue 1, Jan. 2014, pp. 97-109.

(Continued)

*Primary Examiner* — Marcus Taningco
*Assistant Examiner* — Faye Boosalis
(74) *Attorney, Agent, or Firm* — Holzer Patel Drennan

(57) ABSTRACT

A pattern projector disclosed herein generates and projects a structured light pattern suitable for use in a variety of active depth sensing technologies. In one implementation, a structured light pattern is generated by directing a coherent light beam through a pseudorandom diffuser element. Output of the pseudorandom diffuser element is received by a relay optic configured to spatially filter incident light to generate an output speckle illumination and to project the output speckle illumination to a three-dimensional scene.

20 Claims, 6 Drawing Sheets

(56) References Cited

OTHER PUBLICATIONS

Zizka, et al., "SpeckleSense: Fast, Precise, Low-cost and Compact Motion Sensing using Laser Speckle", : In Proceedings of the 24th Annual ACM Symposium on User Interface Software and Technology, Oct. 16, 2011, 10 pages.

International Searching Authority, European Patent Office, International Search Report and Written Opinion for PCT/US2016/012784, dated May 9, 2016, 11 Pages.

International Searching Authority, U.S. Patent and Trademark Office, Second Written Opinion of the International Preliminary Examining Authority for PCT/US2016/012784 dated Nov. 30, 2016, 4 pages.

"International Preliminary Report on Patentability Issued in PCT Application No. PCT/US2016/012784", dated Apr. 12, 2017, 6 Pages.

\* cited by examiner

STRUCTURED LIGHT PATTERN GENERATION

BACKGROUND

Stereo vision involves the extraction of three-dimensional information from images by comparing information about a scene from two different viewpoints. Traditional stereo algorithms are used to generate depth maps from color images.

SUMMARY

Implementations described and claimed herein generate a structured light pattern by passing a coherent light beam through a pseudorandom diffuser element. Light output from the pseudorandom diffuser element is spatially filtered and projected by a relay optic. The projected, spatially filtered light can be detected by appropriate light sensing means and used to calculate a third dimension for objects in two-dimensional images.

In one implementation, a system includes a pseudorandom diffuser element configured to receive a coherent light input and to output intermediate speckle illumination. A relay optic is positioned to receive the intermediate speckle illumination from the pseudorandom diffuser element. The relay optic spatially filters the intermediate speckle illumination to generate an output speckle illumination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

Traditional stereo algorithms are limited in their effectiveness by both the quantity of relevant features in a scene as well as assumptions such as the constancy of brightness within the scene.

A structured infrared (IR) pattern is projected onto the scene and photographed by a single IR camera. Based on deformations of the light pattern, geometric information about the underlying video scene can be determined and used to generate a depth map. In some cases, a structured light pattern is generated using a diffractive optic element (DOE). However, current DOE fabrication processes impose hard limits on attainable resolution and depth of field.

As discussed above, structured light patterns are used in some stereo vision technologies to extract geometry from a scene. However, depth map resolution of these technologies is limited by the density and resolution of individual projected light features (e.g., dots or other patterns). A "depth map" refers to, for example, an image commonly used in three-dimensional computer graphics applications that contains information relating to the distance from a camera viewpoint to a surface of an object in a three-dimensional scene. The technology disclosed herein facilitates generation of a projectable structured light pattern having increased feature resolution, density, and field of view as compared to other technologies currently available for active depth sensing.

Figure 1:
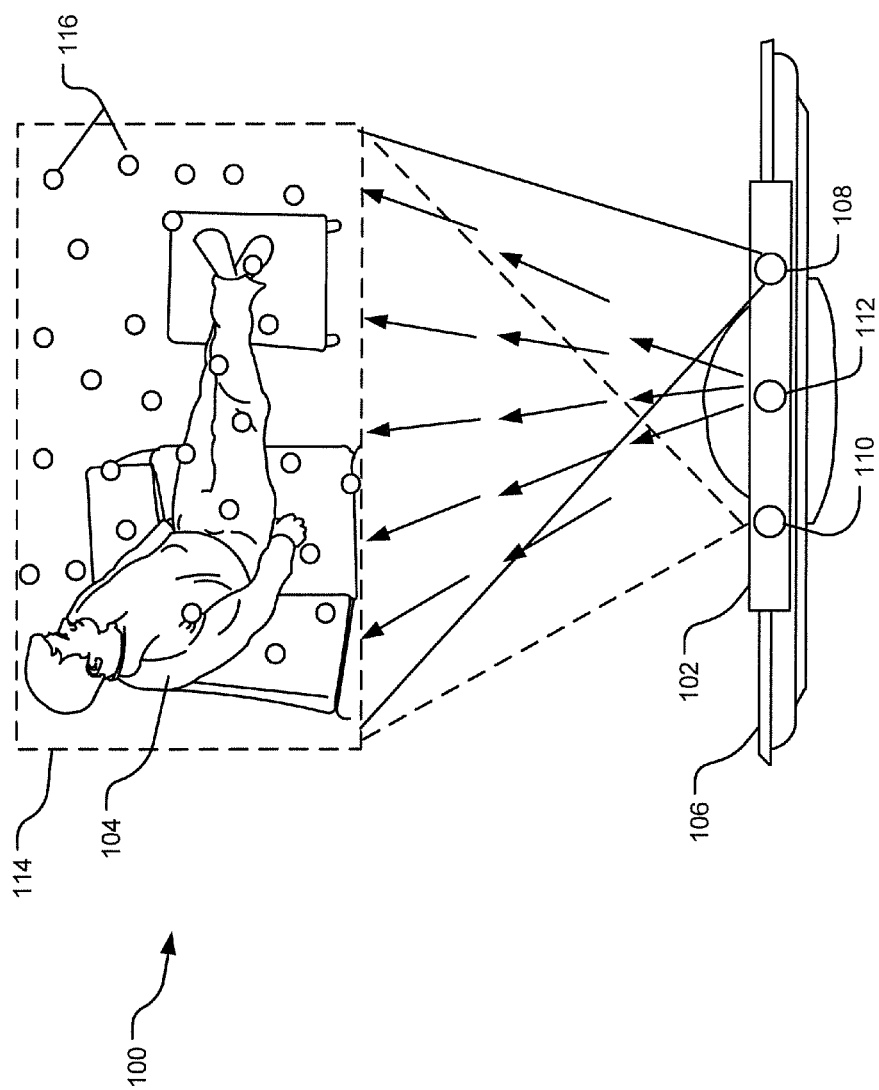
FIG. 1 illustrates an example multimedia environment including a multimedia system configured to generate a depth map of a three-dimensional scene.

FIG. 1 illustrates an example multimedia environment 100 including a multimedia system 102 configured to generate a depth map of a three-dimensional scene 114. The multimedia system 102 may be without limitation a gaming system, a home security system, a computer system, a set-top box, or any other device configured to generate a depth map of a surrounding environment. Additionally, the multimedia system 102 may be used in a variety of applications including without limitation gaming applications, security applications, military applications, etc. A user 104 can interact with the multimedia system 102 by virtue of a user interface 106, which may include a graphical display, an audio system, and a system for depth sensing, target recognition, tracking, etc.

The multimedia system 102 is configured to capture and monitor light from within a field of view of various sensors communicatively connected to the multimedia system 102. Among other components, the multimedia system 102 includes a pattern projector 112 that projects a signal such as visible light (e.g., RGB light) or invisible light (e.g., IR light) into a field of view (e.g., the three-dimensional scene 114). The signal is reflected from objects within the field of view and detected by one or more sensors in the multimedia system 102. Accordingly, the multimedia system 102 can capture a signal generated by the multimedia system 102 that can be used to generate a depth map quantifying distances to various objects in the three-dimensional scene 114.

Although any number of cameras and sensors may be included in various implementations, the multimedia system 102 includes an infrared (IR) camera 108 and an RGB camera 110. The multimedia system 102 is not limited to the use of IR and RGB cameras since many other types of cameras and sensors may be utilized to supplement active depth sensing operations, such as technologies useful in object and motion detection. For example, other implementations of the multimedia system 102 may electrical sensors, stereoscopic sensors, scanned laser sensors, ultrasound sensors, millimeter wave sensors, etc. Some implementations include a single camera that independently collects data used to generate a depth map.

In one implementation, the pattern projector 112 projects a structured (e.g., known or predetermined) light pattern 116 to a space within a three-dimensional scene 114. The structured light pattern 116 is of a wavelength detectable by at least one sensor or camera of the multimedia system 102. For example, the structured light pattern 116 may be infrared light detectable by the IR camera 108 or visible light detectable by the RGB camera 110.

The structured light pattern 116 includes any number of different patterns or features recognizable via analysis of data captured by one or more sensors of the multimedia system 102. In FIG. 1, the structured light pattern 116 is a speckle (e.g., dot) pattern.

According to one implementation, the pattern projector 112 includes a light source, such as a laser, which directs a coherent light beam through a diffusing element to scatter the light and thereby generate light waves with mutually random phases. The scattered light is then directed through a relay optic that spatially filters the scattered light and projects the spatially filtered light onto the three-dimensional scene 114. When the projected light reflects off various objects, the structured light pattern 116 is visible to one or more sensors of the multimedia system 102.

A camera (e.g., the IR camera 108 or the RGB camera 110) captures an image of the structured light pattern reflected in the three-dimensional scene 114, and the image is analyzed to determine a distance to various objects in the three-dimensional scene 114. In one implementation, the image of the structured light pattern 116 reflected in the three-dimensional scene 114 is compared to a saved virtual image of the structured light pattern 116 captured or generated under different circumstances. For example, the virtual image may be an image of the structured light pattern 116 reflected off a flat two-dimensional plane (e.g., a wall or screen) at a known distance from the pattern projector 112.

Objects present in the three-dimensional scene 114 create measureable distortions in the structured light pattern 116. For instance, a projected feature (e.g., a dot) is expected to shift by a known amount when viewed from two disparate locations. That is, a light feature may appear to assume a first position in the reference frame of the pattern projector 112 and a second position in the reference frame of the IR camera 108. If the light feature is projected onto a near-field object, this observed shift (e.g., a pixel shift) is greater than when the feature is projected onto a far-field object. When analyzed using various trigonometric principles, these observed pixel shifts between corresponding points in two or more images can be used to determine depths between the pattern projector 112 and various objects in the three-dimensional scene 114.

According to one implementation, processing modules of the multimedia system 102 create a depth map of the three-dimensional scene 114 using the above described and/or other image analysis techniques.

The RGB camera 110 captures color images of the three-dimensional scene 114 by acquiring three different color signals, i.e., red, green, and blue. In one implementation, the output of the RGB camera 110 provides a useful supplement to a depth map for many applications, such as Free Viewpoint Video (FVV), telepresence, or medical imaging applications. Some implementations of the multimedia system 102 exclude the RGB camera 110; other implementations include multiple RGB cameras.

Although a single IR camera (e.g., the IR camera 108) is shown in FIG. 1, other implementations include multiple IR cameras at different positions relative to the three-dimensional scene 114. In one implementation, two different IR cameras that are gen-locked or synchronized along with the RGB camera 108 so that captured images of the structured light pattern 116 directly correlate to one another.

Figure 2:
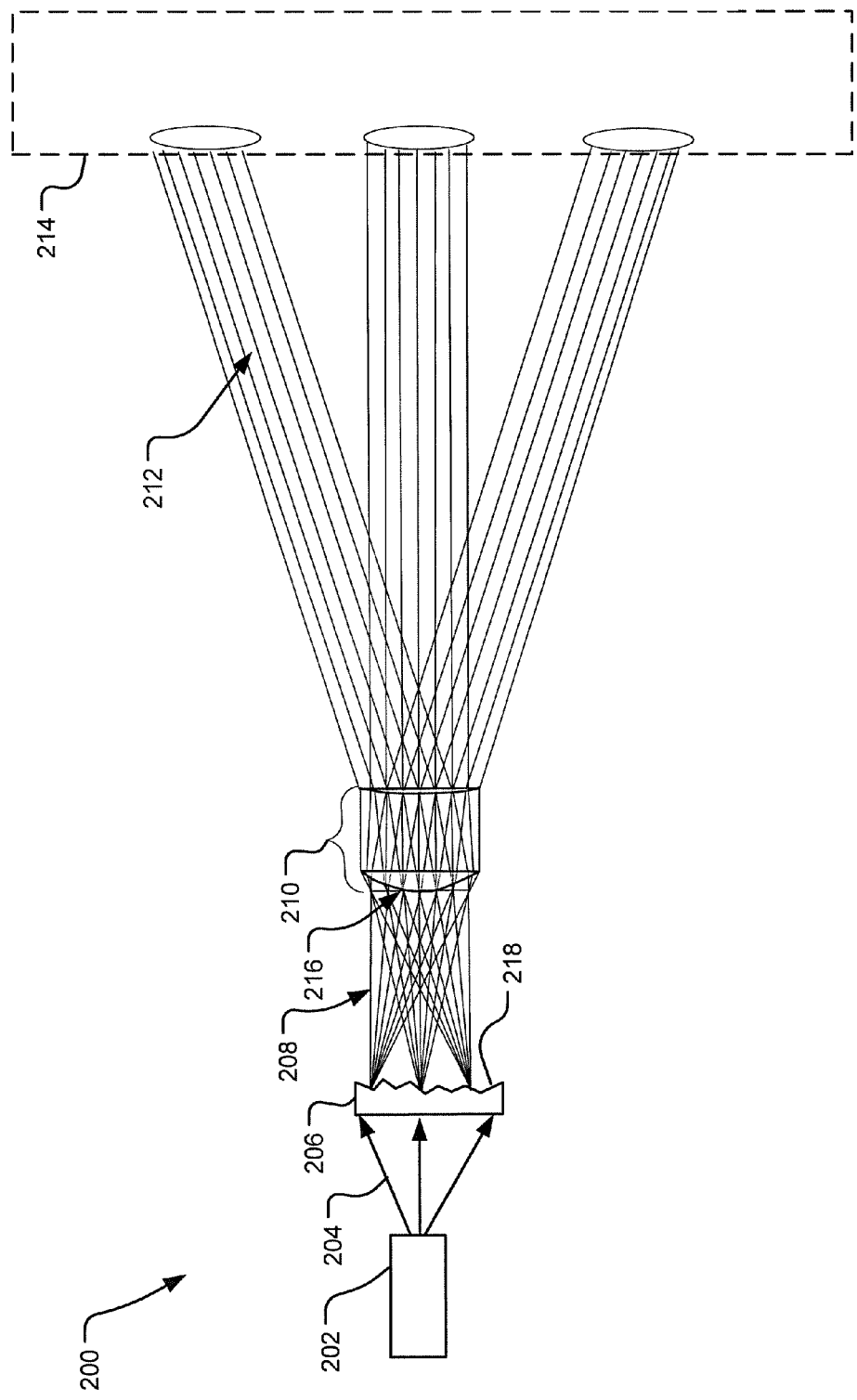
FIG. 2 illustrates an example pattern projector for projecting a structured light pattern to a three-dimensional scene.

FIG. 2 illustrates an example pattern projector 200 for projecting a structured light pattern within a three-dimensional scene 214. The pattern projector 200 includes a light source 202 (e.g., a laser) positioned to direct a coherent light beam 204 through opposing surfaces of a pseudorandom diffuser element 206. The pseudorandom diffuser element 206 scatters the light and creates interference between many scattered waves having mutually random phases. Light output of the pseudorandom diffuser element 206 is generally referred to herein as intermediate speckle illumination 208.

The intermediate speckle illumination 208 is directed through a relay optic 210, which projects an output speckle illumination 212 onto objects (e.g., walls, furniture, people, etc.) within a three-dimensional scene 214 in a field of view of the pattern projector 200.

Although a variety of diffusing elements are suitable for use in other implementations, the pseudorandom diffuser element 206 includes a transparent (or translucent) rough surface 218 engineered to include surface features (e.g., indentations, grooves, etc.) that scatter the coherent light beam 204 passing through the rough surface 218 at a number of angles. In one implementation, ground glass diffusers may be employed as optical windows having a rough surface, although other rough surfaces may be employed. The rough surface may be formed by use of sandblasting, reflective particle lamination and/or implantation, and other methods. The rough surface provides a consistent diffusion pattern across the surface. A rougher surface, having larger grained roughness, reduces the transmission efficiency but provides a wider diffusion pattern than a surface having smaller grained roughness.

Surface roughness is a form of surface texture. Various roughness metrics may be used to characterize the "roughness" of a surface. Profile roughness parameters (e.g., $R_a$, $R_q$, $R_z$, $R_{ak}$, . . . ) are more commonly used, although area roughness parameters (e.g., $S_a$, $S_q$, $S_z$, . . . ) are defined in the ISO 25178 series. Roughness employed in the described technology satisfies the transmission efficiency and diffusion pattern width of the intended application.

Passing the light through the rough surface 218 creates a predetermined diffraction pattern (the intermediate speckle illumination 208) selectively omitting certain spatial frequencies in the diffraction pattern. Changing the roughness of features of the rough surface 218 changes a sampling of the spatial frequencies, altering the resulting intermediate speckle illumination 208.

In various implementations, the relay optic 210 is an individual lens or an assembly of lenses that work together to project and image the output speckle illumination 212. The relay optic 210 alters a diffraction pattern of incident light. Consequently, the intermediate speckle illumination 208 has a different diffraction pattern than the output speckle illumination 212.

The relay optic 210 has multiple purposes and functions. Once purpose of the relay optic 210 is to facilitate the transfer of incident light to an imaging space (e.g., the three-dimensional scene 214) at a substantial distance from the light source 202 (e.g., a few meters). Another purpose of the relay optic 210 is to selectively filter the intermediate speckle illumination 208 and thereby improve the quality (e.g., resolution, feature density, depth of field, etc.) of an image of the output speckle illumination 212.

A number of selectable properties of the relay optic 210 dictate spatial filtering and other coherent imaging effects. For example, one selectable property of the relay optic 210 is the f-number. The f-number corresponds to a degree of spatial filtering that the relay optic 210 applies to the intermediate speckle illumination 208. The f-number relay optic 210 can be tailored to provide spatial filtering at select frequencies in order to increase resolution and/or depth-of-field of an image of the output speckle illumination 212.

Another selectable property of the relay optic 210 is the focal length. The focal length of the relay optic 212 dictates the size of a field of view onto which the output speckle illumination 212 is projected. In one implementation, the output speckle illumination 212 is projected onto a field of view having more than twice a range achievable using commonly available diffractive optical elements (DOEs). When imaged, the output speckle illumination 212 also has a density of features in excess of densities commonly achieved using DOEs.

The above-described and other properties of the relay optic 210 can be independently tuned for each individual system, providing multi-axis control of the output speckle illumination 208.

Figure 3:
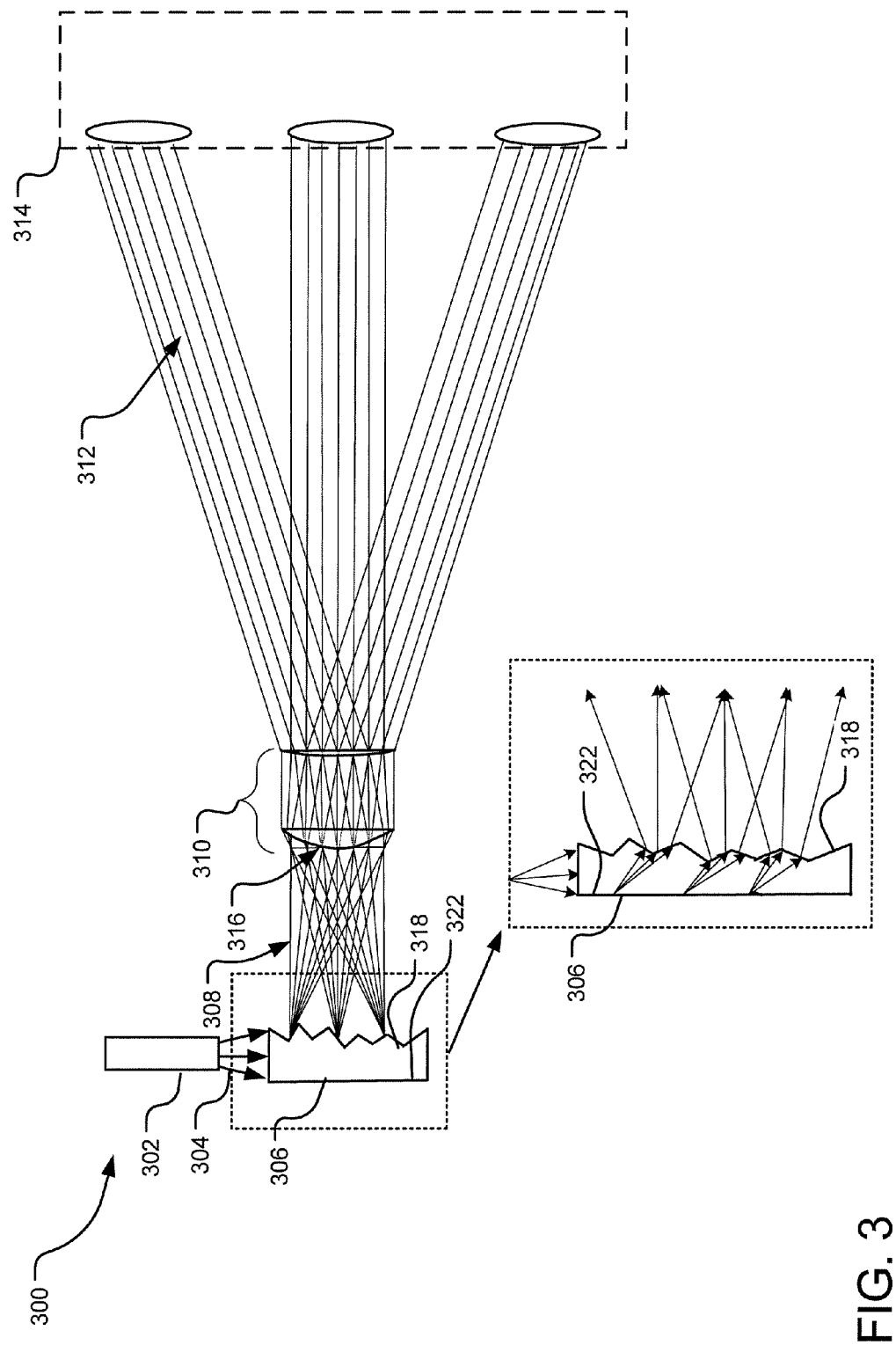
FIG. 3 illustrates another example pattern projector for projecting a structured light pattern to a three-dimensional scene.

FIG. 3 illustrates another example pattern projector 300 for projecting a structured light pattern within a three-dimensional scene 314. The pattern projector 300 includes a light source 302 (e.g., a laser) that side-couples a coherent light beam 304 to a receiving surface 320 of a pseudorandom diffuser element 306 (as shown). The pseudorandom diffuser element 306 includes a rough surface 318 rotated at approximately 90 degrees relative to the receiving surface 320. The rough surface 318 is transparent (or translucent) and includes a number surface features (e.g., indentations, grooves, etc.) that scatter outgoing light at a number of different angles.

The pseudorandom diffuser element 306 scatters the coherent light beam 304 to form an intermediate speckle illumination 308, which is then directed through a relay optic 310. The relay optic 310 alters the intermediate speckle illumination (e.g., by introducing additional interference patterns for spatial filtering) and projects an output speckle illumination 312 to onto objects (e.g., walls, furniture, people, etc.) within the three-dimensional scene 314.

In various implementations, the coherent light beam 304 is directed (e.g., steered) through the rough surface 318 in a number of different ways. In FIG. 3, the pseudorandom diffuser element 306 acts as a waveguide and includes a reflective internal surface 322 that reflects incident light through the rough surface 318.

A degree of roughness of the rough surface 318 may correspond to an intensity of light throughput through the rough surface 318. For example, a decrease in surface roughness may correspond to an increase in light throughput while an increase in surface roughness may correspond to a decrease in light throughput.

In one implementation, the rough surface 318 has an uneven or asymmetrical surface texture to provide for a more uniform distribution and brightness of the intermediate speckle illumination 308. For example, an upper portion of the rough surface 318 (e.g., a portion proximal to the light source 302) may have an increased roughness as compared to a lower portion of the rough surface 318 (e.g., distal to the light source 302). In one implementation, a roughness of the rough surface 318 gradually decreases with increasing distance away from the light source. Other implementations are also contemplated.

Figure 4:
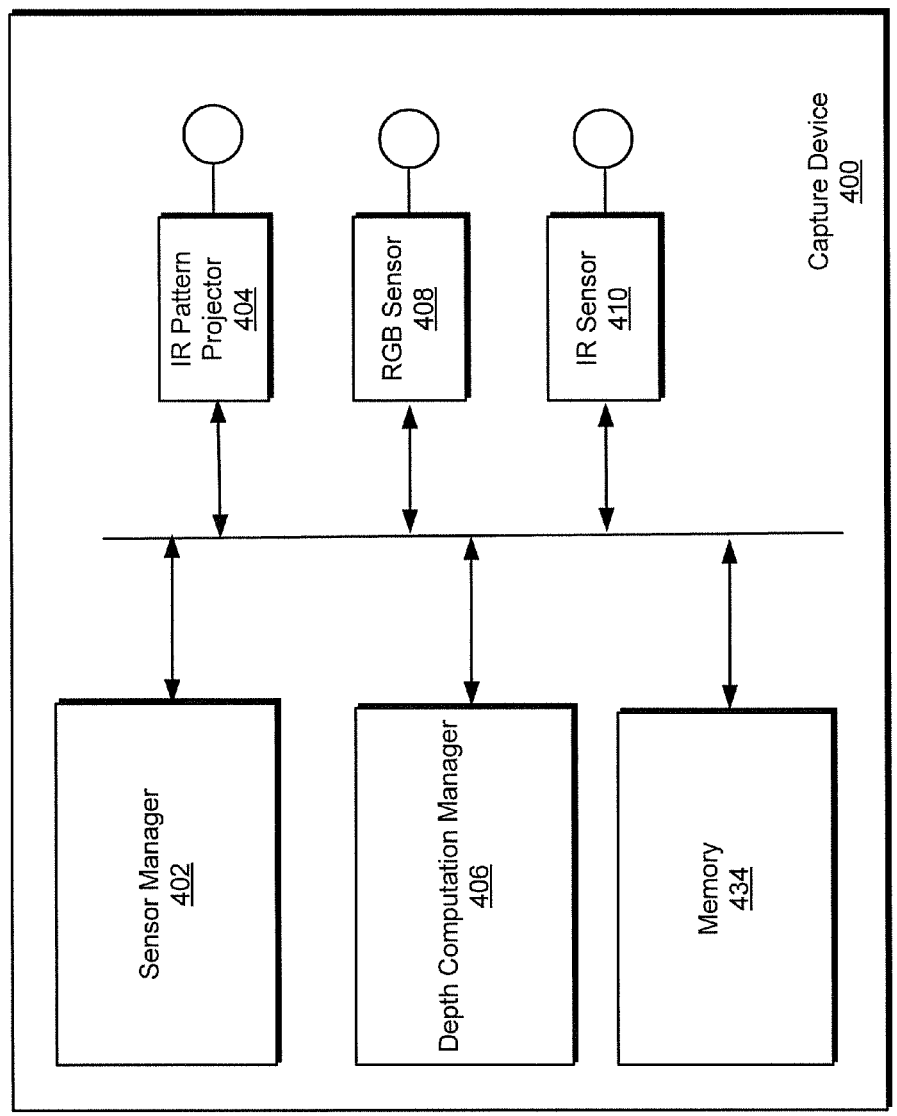
FIG. 4 illustrates an example capture device for active depth sensing.

FIG. 4 illustrates an example capture device 400 for active depth sensing. Among other components, the capture device 400 includes a sensor manager 402 that controls the power, parameters, and focus of various sensors of the capture device 400. In addition, the capture device 400 includes a depth computation manager 406 that utilizes input from the various sensors to compute a depth map of a three-dimensional scene. Although the sensor manager 402 and the depth computation manager 406 are shown to be within the capture device 400 (e.g., embodied in firmware), one or both such components may be physically removed from the capture device 400. For example, the capture device 400 may communicate wirelessly with a computing system including a processor that executes the sensor manager 402 and/or depth computation manager 406 from a remote memory location.

The capture device 400 further includes an IR pattern projector 404 capable of projecting a structured light pattern to an imaging space (e.g., the three-dimensional scene). In addition, the capture device 400 includes one or more sensors, such as an IR sensor 410 and an RGB sensor 408, for detecting the structured light pattern within the imaging space. In other implementations, the capture device 400 includes one or more additional IR sensors, RGB sensors, and other types of sensors. In one implementation, the IR sensor 410 is a passive infrared (IR) sensor operating at IR light wavelengths capable of detecting features of the projected structured light pattern. The IR sensor 410 transmits raw IR image data to the depth computation manager 406.

The RGB sensor 408 is configured to acquire red, green, and blue color signals, which the RGB sensor 408 outputs as RGB data. The sensor manager 402 or another component may combine the signals in the RGB data to capture an image with a broad array of colors. In one implementation, the RGB sensor 408 and the IR sensor 410 are gen-locked or synchronized cameras. Genlocking or synchronizing the cameras ensures that the cameras are temporally coherent so that images captured by the cameras directly correlate to one another. The RGB data may provide a useful supplement to a depth map for many applications.

The depth computation manager 406 identifies corresponding points in received and/or saved image data saved in memory 434 and computes shifts between corresponding points in different images. In one implementation, the depth computation manager 406 retrieves a saved image of the structured light pattern (e.g., an image of the pattern projected onto a flat plane), and compares the saved image to raw image data received from the IR sensor 410. The depth computation manager 406 identifies pixel shifts between corresponding features of the structured light pattern in the raw and saved images, and based on the pixel shifts, generates a depth map of a three-dimensional scene in the field of view of the IR sensor.

In other implementations, the depth computation manager 406 generates a depth map of the three-dimensional scene based on a comparison of image data from multiple synchronized cameras (e.g., multiple IR cameras, RGB cameras, etc.) at different locations relative to the IR pattern projector 404.

Figure 5:
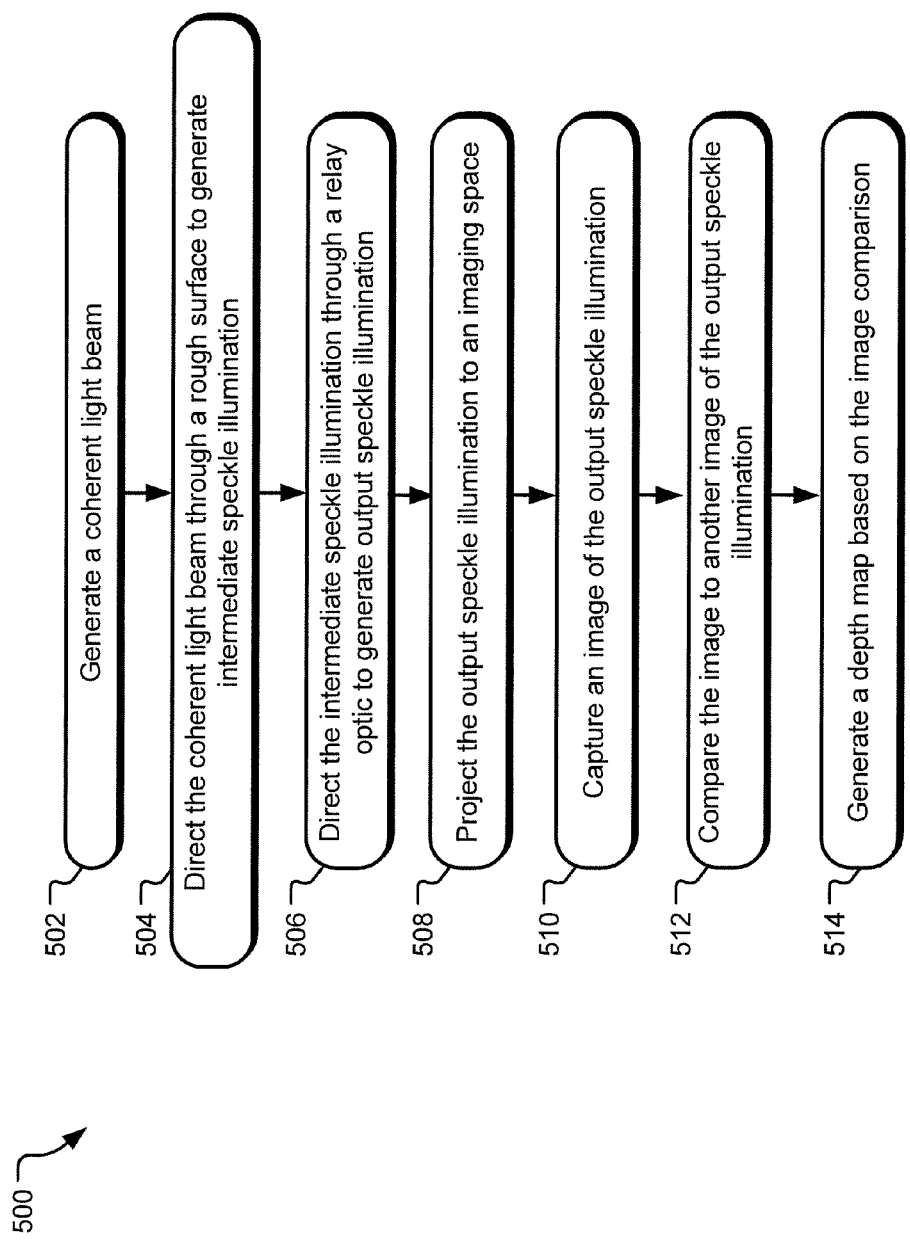
FIG. 5 illustrates example operations for active depth sensing.

FIG. 5 illustrates example operations 500 for generating a structured light speckle pattern. A generation operation 502 generates a coherent light beam, such as a laser beam. In one implementation, the coherent light beam is IR light. In other implementations, the coherent beam is light of a wavelength outside of the IR range, such as visible light, ultraviolet light, microwave light, etc. A direction operation 504 directs the coherent light beam through a rough surface to generate interference patterns and spatially filter the light.

Another direction operation 504 directs the spatially filtered light (also referred to as intermediate speckle illumination) through a relay optic. The relay optic performs additional spatial filtering and projects an output speckle illumination onto an imaging space, such as a room including objects at varying depths from a projection source of the output speckle illumination.

A capturing operation 510 captures an image of the output speckle illumination and sends the imaged data to a processor. A comparing operation 512 of the processor compares the captured image data to one or more other images of the output speckle illumination captured or generated under different circumstances. For example, the captured image data may be compared to an image of the output speckle illumination reflected off a flat two-dimensional plane (e.g., a wall or screen). Based on this image comparison, a generation operation 514 generates a depth map of the image space.

Figure 6:
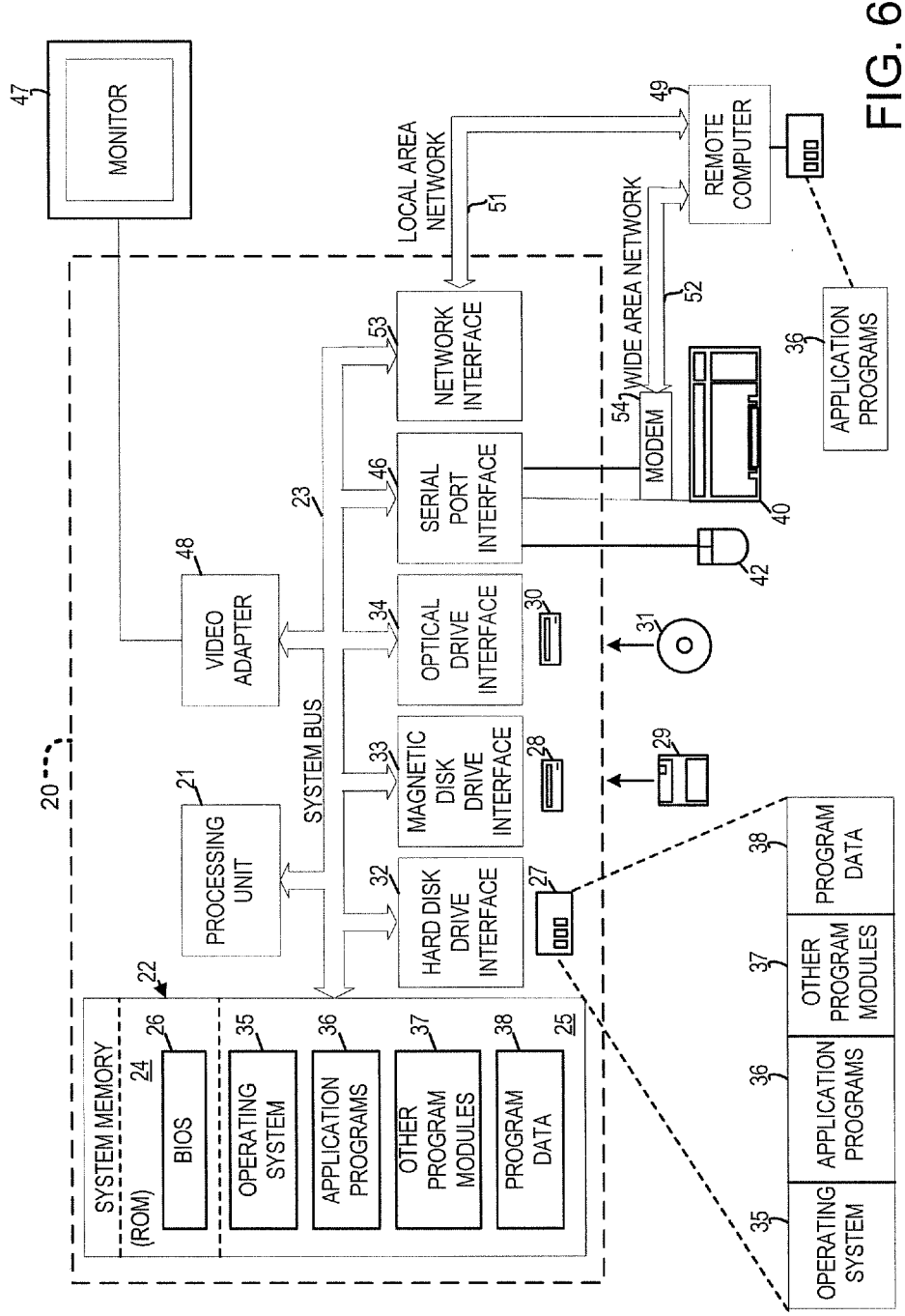
FIG. 6 illustrates an example system that may be useful in implementing the described technology.

FIG. 6 illustrates an example system that may be useful in implementing the described technology. The example hardware and operating environment of FIG. 6 for implementing the described technology includes a computing device, such as general purpose computing device in the form of a gaming console, multimedia console, or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program engines and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, magnetic disk 29, optical disk 31, ROM 24, or RAM 25, including an operating system 35, one or more application programs 36, other program engines 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, a depth management manager, sensor manager, and other engines and services may be embodied by instructions stored in memory 22 and/or storage devices 29 or 31 and processed by the processing unit 21. Sensor signals (e.g., visible or invisible light and sounds), thermal information, depth information, and other data may be stored in memory 22 and/or storage devices 29 or 31 as persistent datastores.

An example system includes a pseudorandom diffuser element configured to receive a coherent light input and to output intermediate speckle illumination and a relay optic positioned to receive the intermediate speckle illumination from the pseudorandom diffuser element. The relay optic is configured to spatially filter the intermediate speckle illumination to generate an output speckle illumination.

Another example system of any preceding system is disclosed wherein a light source is configured to project the coherent light input through a first surface of the pseudorandom diffuser element and the intermediate speckle illumination is to be output through a second opposite surface of the pseudorandom diffuser element.

Another example system of any preceding system is disclosed wherein a light source is configured to project the coherent light input through a first surface of the pseudorandom diffuser element and the intermediate speckle illumination is to be output through a second surface of the pseudorandom diffuser element, the second surface oriented substantially perpendicular to the first surface.

Another example system of any preceding system is disclosed wherein the pseudorandom diffuser element includes at least one transparent rough surface to receive the coherent light input.

Another example system of any preceding system is disclosed wherein the rough surface has an increased roughness in an area proximal to a source of the coherent light input and a decreased roughness in an area distal to the source of the coherent light input.

Another example system of any preceding system further including a sensor configured to detect the output speckle illumination reflected on objects in a three-dimensional scene.

Another example system of any preceding system further including a processor configured to generate a depth map of the three-dimensional scene based on data collected by the sensor.

Another example system of any preceding system is disclosed wherein the coherent light input is generated by a laser.

An example method includes directing a coherent light beam through a pseudorandom diffuser element to output an intermediate speckle illumination and directing the intermediate speckle illumination through a relay optic. The relay optic spatially filters the intermediate speckle illumination to generate an output speckle illumination.

Another method of any preceding method is disclosed wherein a light source projects the coherent light beam through a first surface of the pseudorandom diffuser element and the intermediate speckle illumination is output through a second opposite surface of the pseudorandom diffuser element.

Another method of any preceding method is disclosed wherein a light source projects the coherent light beam through a first surface of the pseudorandom diffuser element and the intermediate speckle illumination is output through a second surface of the pseudorandom diffuser element, the second surface oriented substantially perpendicular to the first surface.

Another method of any preceding method further including projecting the output speckle illumination to a three-dimensional scene and detecting, with a sensor, the output speckle illumination reflected on objects in the three-dimensional scene.

Another method of any preceding method further includes generating a depth map of the three-dimensional scene based on data collected by the sensor.

Another method of any preceding method is disclosed wherein directing the coherent light beam through the pseudorandom diffuser element further includes directing the coherent light beam though a rough surface.

Another method of any preceding method is disclosed wherein the intermediate speckle illumination includes a different light interference pattern than the output speckle illumination.

Another method of any preceding method is disclosed wherein the relay optic has an f-number selected to generate the output speckle illumination of a predetermined resolution.

Another example system includes a relay optic positioned to receive light from a pseudorandom diffuser element, the relay optic spatially filtering the light and projecting the spatially filtered light to a three-dimensional scene. A sensor is configured to detect the spatially-filtered light from the three-dimensional scene. A processor is configured to calculate a depth map of the three-dimensional scene based on data collected by the sensor.

Another example system of any preceding system is disclosed wherein the light is IR light and the sensor is an IR sensor.

Another example system of any preceding system is disclosed wherein the pseudorandom diffuser element includes a rough surface and changing the rough surface changes a sampling of the spatially filtered light.

Another example system of any preceding system is disclosed wherein the rough surface includes areas of uneven roughness.

An example system includes means for directing a coherent light beam through a pseudorandom diffuser element to output an intermediate speckle illumination and means for directing the intermediate speckle illumination through a relay optic. The relay optic spatially filters the intermediate speckle illumination to generate an output speckle illumination.

Another example system of any preceding system is disclosed wherein a light source projects the coherent light beam through a first surface of the pseudorandom diffuser element and the intermediate speckle illumination is output through a second opposite surface of the pseudorandom diffuser element.

Another example system of any preceding system is disclosed wherein a light source projects the coherent light beam through a first surface of the pseudorandom diffuser element and the intermediate speckle illumination is output through a second surface of the pseudorandom diffuser element, the second surface oriented substantially perpendicular to the first surface.

Another example system of any preceding system further includes means for projecting the output speckle illumination to a three-dimensional scene and detecting, with a sensor, the output speckle illumination reflected on objects in the three-dimensional scene.

Another example system of any preceding system further includes means for generating a depth map of the three-dimensional scene based on data collected by the sensor.

Another example system of any preceding system is disclosed wherein means for directing the coherent light beam through the pseudorandom diffuser element further includes means for directing the coherent light beam though a rough surface.

Another example system of any preceding system is disclosed wherein the intermediate speckle illumination includes a different light interference pattern than the output speckle illumination.

Another example system of any preceding system is disclosed wherein the relay optic has an f-number selected to generate the output speckle illumination of a predetermined resolution.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The implementations of the subject matter described herein are implemented as logical steps in one or more computer systems. The logical operations of the present disclosed subject matter are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed subject matter. Accordingly, the logical operations making up the embodiments of the disclosed subject matter described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A system comprising:
    a pseudorandom diffuser element configured to receive a non-collimated coherent light input and to scatter the coherent light input to output intermediate speckle illumination; and
    a relay optic positioned to receive the intermediate speckle illumination from the pseudorandom diffuser element, the relay optic being configured to spatially filter the intermediate speckle illumination to generate an output speckle illumination.

2. The system of claim 1 wherein a light source is configured to project the non-collimated coherent light input through a first surface of the pseudorandom diffuser element and the intermediate speckle illumination is to be output through a second opposite surface of the pseudorandom diffuser element.

3. The system of claim 1 wherein a light source is configured to project the non-collimated coherent light input through a first surface of the pseudorandom diffuser element and the intermediate speckle illumination is to be output through a second surface of the pseudorandom diffuser element, the second surface oriented substantially perpendicular to the first surface.

4. The system of claim 1 wherein the pseudorandom diffuser element includes at least one transparent rough surface to receive the non-collimated coherent light input.

5. The system of claim 4, wherein the rough surface has an increased roughness in an area proximal to a source of the non-collimated coherent light input and a decreased roughness in an area distal to the source of the coherent light input.

6. The system of claim 1, further comprising:
    a sensor configured to detect the output speckle illumination reflected on objects in a three-dimensional scene.

7. The system of claim 6, further comprising:
    a processor configured to generate a depth map of the three-dimensional scene based on data collected by the sensor.

8. The system of claim 1 wherein the non-collimated coherent light input is generated by a laser.

9. A method comprising:
    directing a non-collimated coherent light beam through a pseudorandom diffuser element to scatter the coherent light input to output an intermediate speckle illumination; and
    directing the intermediate speckle illumination through a relay optic, the relay optic spatially filtering the intermediate speckle illumination to generate an output speckle illumination.

10. The method of claim 9 wherein a light source projects the non-collimated coherent light beam through a first surface of the pseudorandom diffuser element and the intermediate speckle illumination is output through a second opposite surface of the pseudorandom diffuser element.

11. The method of claim 9 wherein a light source projects the non-collimated coherent light beam through a first surface of the pseudorandom diffuser element and the intermediate speckle illumination is output through a second surface of the pseudorandom diffuser element, the second surface oriented substantially perpendicular to the first surface.

12. The method of claim 9 further comprising:
    projecting the output speckle illumination to a three-dimensional scene; and
    detecting, with a sensor, the output speckle illumination reflected on objects in the three-dimensional scene.

13. The method of claim 9 further comprising:
    generating a depth map of the three-dimensional scene based on data collected by the sensor.

14. The method of claim 9 wherein directing the non-collimated coherent light beam through the pseudorandom diffuser element further comprises:
    directing the coherent light beam though a rough surface.

15. The method of claim 9 wherein the intermediate speckle illumination includes a different light interference pattern than the output speckle illumination.

16. The method of claim 9 wherein the relay optic has an f-number selected to generate the output speckle illumination of a predetermined resolution.

17. A system comprising:
    a relay optic positioned to receive non-collimated coherent intermediate speckle illumination from a pseudorandom diffuser element, the relay optic being configured to spatially filter the light and to project the spatially filtered light to a three-dimensional scene; and
    a sensor configured to detect the spatially-filtered light from the three-dimensional scene; and
    a processor configured to calculate a depth map of the three-dimensional scene based on data collected by the sensor.

18. The system of claim 17 wherein the light is IR light and the sensor is an IR sensor.

19. The system of claim 18 wherein the rough surface includes areas of uneven roughness.

20. The system of claim 17 wherein the pseudorandom diffuser element includes a rough surface and changing the rough surface changes a sampling of the spatially filtered light.

* * * * *